US012032197B2

(12) United States Patent
Kim et al.

(10) Patent No.: US 12,032,197 B2
(45) Date of Patent: Jul. 9, 2024

(54) DISPLAY DEVICE

(71) Applicant: LG ELECTRONICS INC., Seoul (KR)

(72) Inventors: Jingyeong Kim, Seoul (KR); Junhyeong Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/768,808

(22) PCT Filed: Oct. 15, 2019

(86) PCT No.: PCT/KR2019/013466
§ 371 (c)(1),
(2) Date: Apr. 13, 2022

(87) PCT Pub. No.: WO2021/075591
PCT Pub. Date: Apr. 22, 2021

(65) Prior Publication Data
US 2024/0045137 A1    Feb. 8, 2024

(51) Int. Cl.
*F21V 8/00* (2006.01)
(52) U.S. Cl.
CPC ......... *G02B 6/0088* (2013.01); *G02B 6/0073* (2013.01); *G02B 6/009* (2013.01)
(58) Field of Classification Search
CPC .. G02B 6/0086; G02B 6/0088; G02B 6/0093; G02B 6/0073; G02B 6/009; G02F 1/133314; G02F 1/133608
See application file for complete search history.

(56) References Cited

U.S. PATENT DOCUMENTS 8,421,950 B2* 4/2013 Kim .................. G02B 6/0093
361/679.01
2013/0342789 A1* 12/2013 Zhang .............. G02B 6/0091
362/606

(Continued)

FOREIGN PATENT DOCUMENTS

KR  10-2011-0030953    3/2011
KR  10-2011-0067445    6/2011

(Continued)

OTHER PUBLICATIONS

PCT International Application No. PCT/KR2019/013466, International Search Report dated Jul. 8, 2020, 2 pages.

*Primary Examiner* — Matthew J. Peerce
(74) *Attorney, Agent, or Firm* — LEE, HONG, DEGERMAN, KANG & WAIMEY (57) ABSTRACT

Disclosed is a display device. A display device according to the present invention comprises: a display panel; a backlight unit located behind the display panel and providing light to the display panel; and a guide panel that is located at an edge of the display panel, and includes a panel support part located between the display panel and the backlight unit and an extension part extending from the panel support part and surrounding a side surface of the backlight unit. The backlight unit includes: a light guide plate; and a light source module located at a light incident part and irradiating at least one side surface of the light guide plate with light, and the panel support part includes a rib protruding toward the light source module and facing the front surface of the light source module.

11 Claims, 6 Drawing Sheets

(56) References Cited

U.S. PATENT DOCUMENTS

2015/0185409 A1     7/2015   Kim et al.
2016/0381317 A1*   12/2016   Hosoki ................ G02B 6/0068
                                                                     349/65

FOREIGN PATENT DOCUMENTS

| KR | 10-2016-0070267 | 6/2016 |
| KR | 1020170078484 | 7/2017 |
| KR | 1020180138234 | 12/2018 |
| KR | 1020190029180 | 3/2019 |
| KR | 20190075754 A * | 7/2019 |
| KR | 1020190075754 | 7/2019 |

* cited by examiner

DISPLAY DEVICE

CROSS-REFERENCE TO RELATED APPLICATIONS

This application is the National Stage filing under 35 U.S.C. 371 of International Application No. PCT/KR2019/013466, filed on Oct. 15, 2019, the contents of which are all incorporated by reference herein in its entirety.

TECHNICAL FIELD

The present invention relates to a display device.

BACKGROUND ART

As the information society develops, demand for display devices is also increasing in various forms and, in response to this, various display devices, such as liquid crystal display (LCD), plasma display panel (PDP), electroluminescent display (ELD), and vacuum fluorescent display (VFD), have been researched and used in recent years.

Among them, the liquid crystal panel of the LCD may include a liquid crystal layer and a thin film transistor (TFT) substrate and a color filter substrate that face each other with the liquid crystal layer interposed therebetween and may display images using the light provided from a backlight unit.

DETAILED DESCRIPTION OF THE INVENTION

Technical Problem

The present invention aims to provide a display device capable of preventing a change in the position of a light source module in a process or use environment.

Technical Solution

According to the present invention, a display device comprises a display panel; a backlight unit positioned behind the display panel and providing light to the display panel; and a guide panel positioned on an edge of the display panel and including a panel support positioned between the display panel and the backlight unit and an extension extending from the panel support and surrounding a side surface of the backlight unit. The backlight unit includes a light guide plate; and a light source module positioned on a light incident portion and radiating light to at least a side surface of the light guide plate. The panel support includes a rib protruding toward the light source module and facing a front surface the light source module.

The light source module may include a printed circuit board; and a light source mounted on the printed circuit board and facing a side surface of the light guide plate. The rib may overlap, in a front-rear direction, at least one of a front surface of the printed circuit board and a front surface of the light source.

A lateral width of the rib may be larger than a lateral width of the printed circuit board.

The rib may directly contact the front surface of the light source module.

The rib may be spaced apart from the front surface of the light source module by a preset distance. The preset distance may be 0.3 mm or less.

According to an embodiment of the present invention, the display device may further comprise a light source housing positioned on the light incident portion and including a first body surrounding a side surface of the backlight unit and to which the light source module is fixed and a second body surrounding a rear surface of the backlight unit; and a light source module adhesive member interposed between the light source module and the first body to fix the light source module and the first body.

A rear surface of the light source module may directly contact the second body.

The rear surface of the light source module and the second body may be spaced apart from each other by a preset distance. The preset distance may be 0.3 mm or less.

According to an embodiment of the present invention, the display device may further comprise a cover bottom positioned behind the light source housing and including a first portion surrounding the side surface of the backlight unit and a second portion surrounding the rear surface of the backlight unit. The panel support may include a groove formed between the extension and the rib. At least one of an end of the first body and an end of the first portion may be received in the groove.

According to an embodiment of the present invention, the display device may further comprise a panel adhesive member positioned between the display panel and the panel support. The panel support may include a first stopper protruding forward and positioned inside the panel adhesive member. The rib may be positioned between the extension and the first stopper.

According to an embodiment of the present invention, the display device may further comprise a first shock absorbing member positioned between the panel support and the backlight unit and fixed to a rear surface of the panel support.

According to an embodiment of the present invention, the display device may further comprise a top case positioned on the edge of the display panel and including a front portion surrounding at least a portion of a front portion of the display panel and a side portion surrounding the extension from an outside. The panel support may include a first support protruding toward the front portion and supporting the front portion. The extension may include a second support protruding toward the side portion and supporting the side portion.

According to an embodiment of the present invention, the display device may further comprise a second shock absorbing member positioned between the front portion and the display panel and fixed to a rear surface of the front portion.

Advantageous Effects

The present invention may limit a change in the position of the light source module, preventing hot spots that may occur in the light incident portion. Accordingly, the present invention may advantageously provide a display device having a narrow or extremely narrow bezel with enhanced image quality.

MODE FOR CARRYING OUT THE INVENTION

Hereinafter, a display device according to the present invention is described in detail with reference to the accompanying drawings.

Various changes may be made to the present invention, and the present invention may come with a diversity of embodiments. Some embodiments of the present invention are shown and described in connection with the drawings. However, it should be appreciated that the present disclosure is not limited to the embodiments, and all changes and/or equivalents or replacements thereto also belong to the scope of the present disclosure.

In describing the present invention, the terms "first" and "second" may be used to describe various components, but the components may not be limited by the terms. The terms may be used to distinguish one component from another. For example, a first component may be denoted a second component, and vice versa without departing from the scope of the present disclosure.

The term "and/or" may denote a combination(s) of a plurality of related items as listed or any of the items.

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when a component is "directly connected to" or "directly coupled to" another component, no other intervening components may intervene therebetween.

The terms as used herein are provided merely to describe some embodiments thereof, but not to limit the present disclosure. It is to be understood that the singular forms "a," "an," and "the" include plural references unless the context clearly dictates otherwise.

It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Further, the following embodiments are provided to give a more thorough explanation to one of ordinary skill in the art, and the shape and size of elements in the drawings may be exaggerated for clearer explanation.

Figure 1:
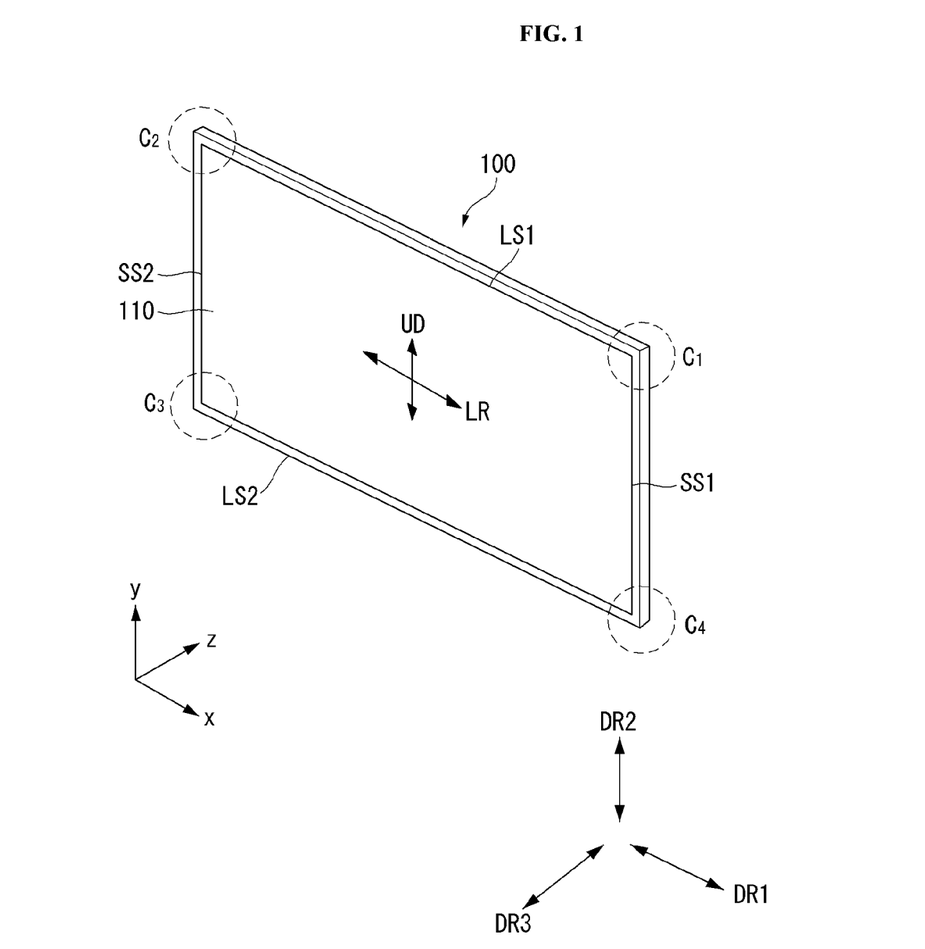
FIG. 1 is a view schematically illustrating a display device according to the present invention.

FIG. 1 is a view schematically illustrating a display device according to the present invention.

Referring to FIG. 1, according to the present invention, a display device 100 may include a first long side LS1, a second long side LS2 opposite to the first long side LS1, a first short side SS1 adjacent to the first long side LS1 and the second long side LS2, and a second short side SS2 opposite to the short side SS1.

Here, the first short side area SS1 may be referred to as a first side area, and the second short side area SS2 may be referred to as a second side area opposite to the first side area. The first long side area LS1 may be referred to as a third side area adjacent to the first side area and the second side area and positioned between the first side area and the second side area. The second long side area LS2 may be referred to as a fourth side area adjacent to the first side area and the second side area, positioned between the first side area and the second side area, and opposite to the third side area.

Further, for convenience of description, the lengths of the first and second long sides LS1 and LS2 are shown and described as being longer than the lengths of the first and second short sides SS1 and SS2, but the lengths of the first and second long sides LS1 and LS2 may be substantially equal to the lengths of the first and second short sides SS1 and SS2.

Further, in the following, the first direction DR1 may be a direction parallel to the long sides LS1 and LS2 of the display panel 110, and the second direction DR2 may be a direction parallel to the short sides SS1 and SS2 of the display panel 110. The third direction DR3 may be a direction perpendicular to the first direction DR1 and/or the second direction DR2.

The first direction DR1 and the second direction DR2 may be collectively referred to as a horizontal direction. Further, the third direction DR3 may be referred to as a vertical direction.

A side to which the display device 100 displays images may be referred to as a forward direction or front side or front surface. A side to which an image displayed by the display device 100 is not observed may be referred to as a rearward direction or rear side or rear surface. When the display device 100 is viewed from the front or the front surface, the side of the first long side LS1 may be referred to as an upper side or an upper surface. Similarly, the side of the second long side LS2 may be referred to as a lower side or a lower surface. Similarly, the side of the first short side SS1 may be referred to as a right side or a right surface, and the side of the second short side SS2 may be referred to as a left side or a left surface.

Further, the first long side LS1, the second long side LS2, the first short side SS1, and the second short side SS2 may be referred to as edges of the display device 100. Further, where the first long side LS1, the second long side LS2, the first short side SS1, and the second short side SS2 meet each other may be referred to as a corner. For example, where the first long side LS1 and the first short side SS1 meet may be a first corner C1, and where the first long side LS1 and the second short side SS2 meet may be a second corner C2. Where the second short side SS2 and the second long side LS2 meet may be a third corner C3, and where the second long side LS2 and the first short side SS1 meet may be a fourth corner C4.

Here, a direction from the first short side SS1 to the second short side SS1 or a direction from the second short side SS2 to the first short side SS1 may be referred to as a left-right direction LR. A direction from the first long side LS1 to the second long side LS2 or from the second long side LS2 to the first long side LS1 may be referred to as an up-down direction UD.

Figure 2:
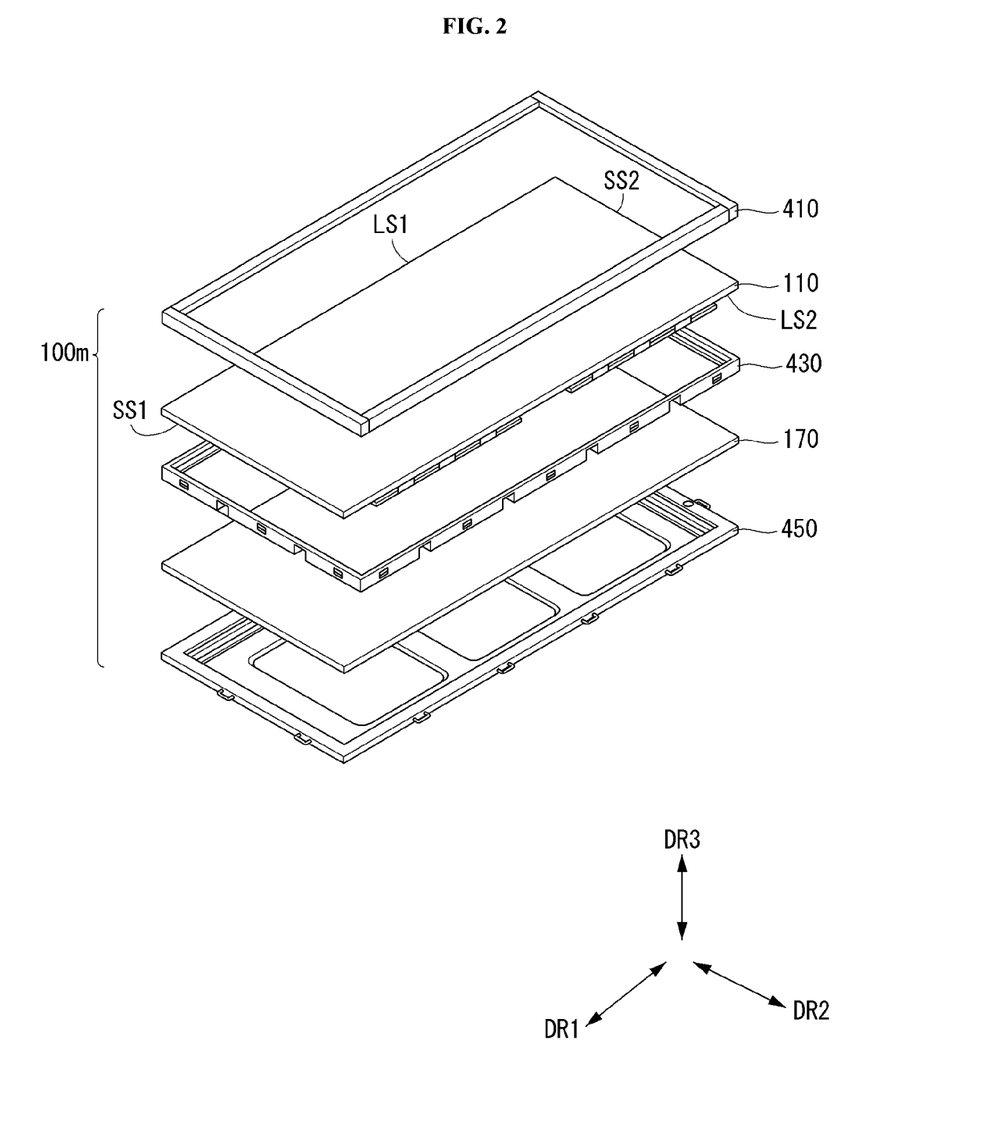
FIG. 2 is an exploded perspective view schematically illustrating a display device according to a preferred embodiment of the present invention.
Figure 3:
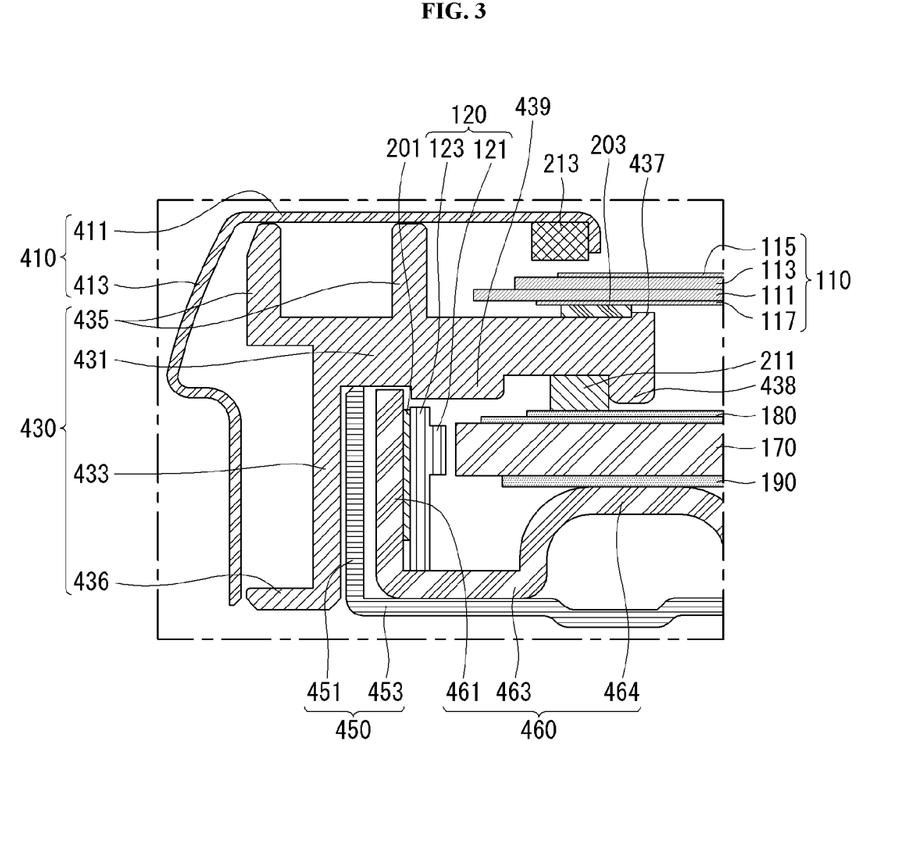
FIG. 3 is a cross-sectional view schematically illustrating a light incident portion of a display device according to a preferred embodiment of the present invention.
Figure 4:
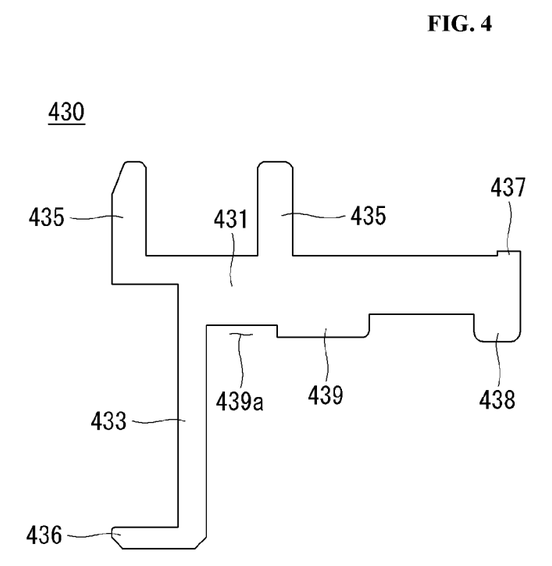
FIG. 4 is a cross-sectional view schematically illustrating a shape of a guide panel according to a preferred embodiment of the present invention.
Figure 5:
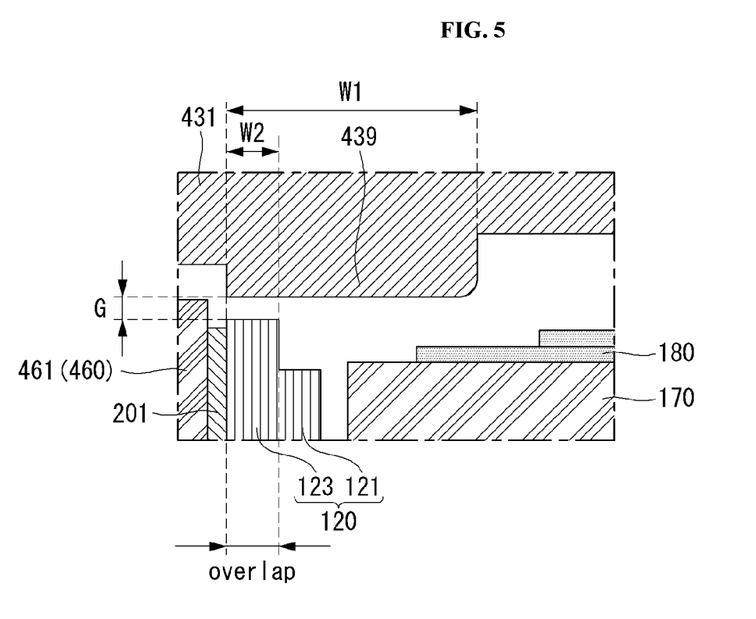
FIG. 5 is a cross-sectional view schematically illustrating a relationship in position between a guide panel and a light source module according to a preferred embodiment of the present invention.
Figure 6:
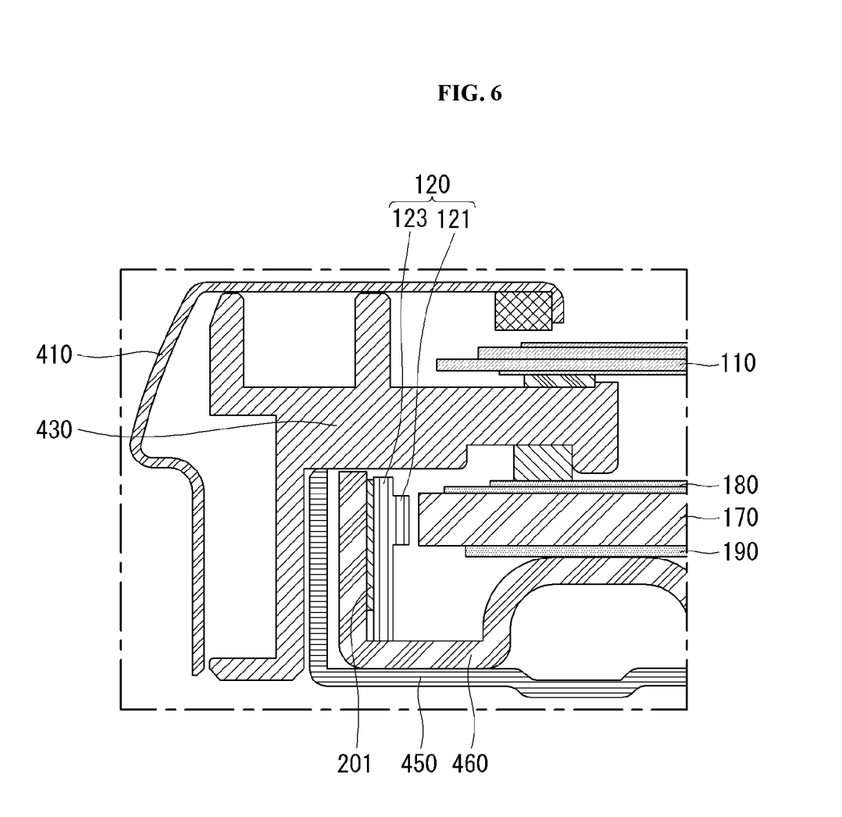
FIGS. 6 and 7 are views illustrating effects of a preferred embodiment of the present invention.
Figure 7:
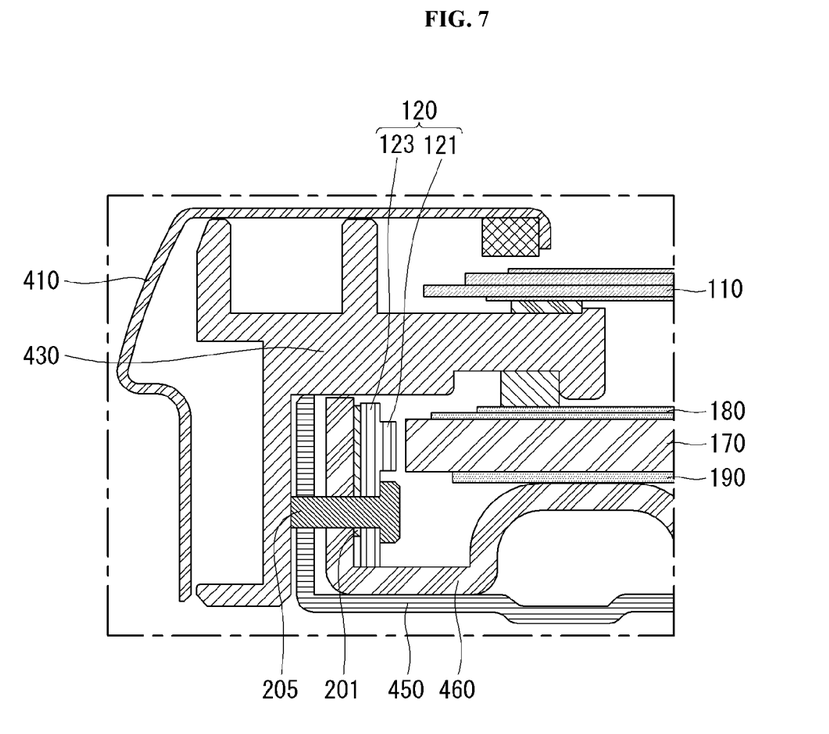

FIG. 2 is an exploded perspective view schematically illustrating a display device according to a preferred embodiment of the present invention. FIG. 3 is a cross-sectional view schematically illustrating a light incident portion of a display device according to a preferred embodiment of the present invention. FIG. 4 is a cross-sectional view schematically illustrating a shape of a guide panel according to a preferred embodiment of the present invention. FIG. 5 is a cross-sectional view schematically illustrating a relationship in position between a guide panel and a light source module according to a preferred embodiment of the present invention. FIGS. 6 and 7 are views illustrating effects of a preferred embodiment of the present invention.

Referring to FIGS. 2 and 3, according to the present invention, a display device 100 may include a display panel 110 and a backlight unit disposed under the display panel 110.

The display panel 110 controls the light transmittance of liquid crystal to display an image, and the display panel 110 may include a first substrate 113, a second substrate 111, a lower polarizing film 117, and an upper polarizing film 115 which are joined together, with a liquid crystal layer (not shown) interposed therebetween. The display panel 110 may adjust the light transmittance of the liquid crystal layer by driving the liquid crystal layer according to the electric field formed by the data voltage and common voltage applied to each pixel, thereby displaying a predetermined color image.

A panel driver (not shown) may be connected to a pad unit provided on the second substrate 111 to transfer a signal for driving each pixel of the display panel 110. The panel driver may include a plurality of circuit films coupled to the pad unit of the display panel 110, a data driving integrated circuit mounted on each of the plurality of circuit films, and a display printed circuit (not shown) connected to each of the plurality of circuit films. A timing controller (not shown) may be mounted on the display printed circuit board.

The second substrate 111 is a thin film transistor array substrate and may include a plurality of pixels defined by a plurality of gate lines and a plurality of data lines crossing each other. Each pixel may include a thin film transistor connected to a gate line and a data line, a pixel electrode connected to the thin film transistor, and a common electrode disposed adjacent to the pixel electrode to supply a common voltage. In this case, the common electrode may be disposed on the first substrate 113 according to the driving scheme of the liquid crystal layer. The pad unit connected to the panel driver is provided on one side of the second substrate 111.

The first substrate 113 is a color filter array substrate and may be formed to have a relatively smaller area than the second substrate 111, but is not limited thereto. The first substrate 113 may be bonded to the second substrate 111 with the liquid crystal layer interposed therebetween so as to overlap the remaining area except for the pad unit of the second substrate 111.

Specific configurations of the second substrate 111 and the first substrate 113 may have various forms known in the art depending on the driving mode of the liquid crystal layer, e.g., a twisted nematic (TN) mode, a vertical alignment (VA) mode, an in plane switching (IPS) mode, and a fringe field switching (FFS) mode. In the drawings, the second substrate 111 is illustrated as being positioned on the first substrate 113 as an example, but the present invention is not limited thereto, the first substrate 113 may be positioned on the second substrate 111.

The backlight unit may be provided under the display panel 110 and may radiate light toward the rear surface of the display panel 110. The backlight unit may include a light source module 120, a light guide plate 170, and at least one optical sheet 180. The light supplied from the light source module 120 to the light incident surface of the light guide plate 170 may be converted into surface light and emitted toward the front of the light guide plate 170, and it may pass through the optical sheet 180 positioned before the light guide plate 170 and be uniformly radiated to the rear surface of the display panel 110.

The light source module 120 may be disposed in the light incident portion to face the light incident surface of the light guide plate 170, radiate light to the light incident surface provided on at least one side surface of the light guide plate 170. The light source module 120 includes a light source 121 and a light source printed circuit board 123 (hereinafter, 'printed circuit board'). The light source 121 may be mounted on the printed circuit board 123. The light source 121 may emit light in response to a light source driving signal from a backlight driver (not shown). The light source 121 may be a light emitting diode (LED), but is not limited thereto.

The optical sheet 180 may be configured as multiple layers including one or more prism sheets and one or more diffuser sheets. The optical sheet 180 may diffuse the light incident from the light guide plate 170 and may refract the propagation path of the light at an angle substantially perpendicular to the rear surface of the display panel 110. The optical sheet 180 may further include a functional sheet, such as a multilayer optical film (MOF, DBEF-D) and a protection film, but is not limited thereto.

A reflective sheet 190 for reflecting light incident from the light guide plate 170 may be further disposed under the light guide plate 170. The reflective sheet 190 may increase the efficiency of light incident on the display panel 110. The reflective sheet 190 may be fixed to a light source housing 460 and/or a cover bottom 450.

The display panel 110 and the backlight unit may be assembled together with guide members, such as the cover bottom 450, a guide panel 430, a top case 410, and the light source housing 460, to be implemented as a liquid crystal module (LCM).

The cover bottom 450 may be positioned behind the display panel 110. The cover bottom 450 may be formed in an "L" shape whose cross-section has at least one curved portion. The cover bottom 450 may be disposed to surround the side and rear surfaces of the backlight unit. The cover bottom 450 may include a first portion 451 surrounding the side surface of the backlight unit and a second portion 453 surrounding the rear surface of the backlight unit. The second portion 453 may be a portion extending from one end of the first portion 451.

The backlight unit including the light source 121, the light guide plate 170, and the optical sheet 180 may be received in the inner space provided by the cover bottom 450. The cover bottom 450 may include a material having high thermal conductivity and high rigidity to smoothly radiate the heat from the driving circuit and the light source module 120 to the outside.

The guide panel 430 may be positioned behind the display panel 110. The guide panel 430 may have a rectangular frame shape with a through hole in the center. The guide panel 430 may be formed of a plastic-based material that may be molded, such as polycarbonate. The guide panel 430 and the cover bottom 450 may be fixed to each other through at least one fastening structure. The fastening structure may include a fastening means, such as a hook and/or a screw, but is not limited thereto.

The guide panel 430 may be formed in an "L" shape whose cross-section has at least one curved portion. The guide panel 430 may include a panel support 431 positioned between the display panel 110 and the backlight unit and an extension 433 surrounding the side surface of the backlight unit. The panel support 431 may be provided between the display panel 110 and the backlight unit, supporting the edge of the display panel 110 from the rear. The panel support 431 may be provided between the display panel 110 and the optical sheet 180, maintaining a constant distance between the display panel 110 and the optical sheet 180. The extension 433 may extend from the panel support 431 and may be disposed to surround the first portion 451 of the cover bottom 450 from the outside of the cover bottom 450. The extension 433 may extend from one end of the panel support 431 toward the rear.

The panel support 431 may include a front surface facing at least a portion of the rear surface of the display panel 110 and a rear surface facing at least a portion of the front surface of the backlight unit. A panel adhesive member 203 may be positioned between the front surface of the panel support 431 and the rear surface of the display panel 110. The panel support 431 and the display panel 110 may be fixed to each other by the panel adhesive member 203. The panel adhesive member 203 may be a double-sided tape, but is not limited thereto.

A first shock absorbing member 211 may be positioned between the rear surface of the panel support 431 and the front surface of the backlight unit. The first shock absorbing member 211 may be fixed to the rear surface of the panel support 431. The first shock absorbing member 211 may be positioned between the panel support 431 and the backlight unit, e.g., the optical sheet 180, preventing a direct collision between the panel support 431 and the optical sheet 180. In other words, the first shock absorbing member 211 may prevent damage to the optical sheet 180 as the panel support 431 presses the optical sheet 180 by the external force provided. The first shock absorbing member 211 may be a foam pad, but is not limited thereto.

The panel support 431 may further include a first stopper 437 protruding forward. The first stopper 437 may be positioned inside the panel adhesive member 203 to prevent escape of the panel adhesive member 203. Further, the first stopper 437 may guide the bonding position of the panel adhesive member 203.

The panel support 431 may further include a second stopper 438 protruding rearward. The second stopper 438 may be positioned inside the first shock absorbing member 211 to prevent escape of the first shock absorbing member 211. Further, the second stopper 438 may guide the bonding position of the first shock absorbing member 211.

The panel support 431 may further include a first support 435 protruding forward. The first support 435 may extend toward the top case 410 to be described below, supporting the top case 410 from the rear. A plurality of first supports 435 may be configured. The adjacent first supports 435 may be positioned to be spaced apart from each other by a predetermined distance. The first support 435 may be disposed to surround the side surface of the display panel 110 from the outside of the display panel 110.

The first support 435 may restrict the movement of the top case 410 by supporting the top case 410 from the rear. In other words, the first support 435 may prevent the top case 410 from pressing the display panel 110 by the provided external force. Accordingly, according to a preferred embodiment of the present invention, it is possible to prevent damage to the display panel 110 by providing the first support 435.

The extension 433 may further include a second support 436 protruding laterally. The first support 435 may extend toward the top case 410 to be described below, supporting the top case 410 from the side. The second support 436 may restrict the movement of the top case 410 by supporting the top case 410 from the side. In other words, the second support 436 may prevent the top case 410 from being deformed by the provided external force.

The top case 410 may be positioned in front of the display panel 110. The top case 410 may have a rectangular frame shape with a through hole in the center. The top case 410 and the guide panel 430 may be fixed to each other through at least one fastening structure. The fastening structure may include a fastening means, such as a hook and/or a screw, but is not limited thereto. The top case 410 may be formed of an aluminum alloy, but is not limited thereto.

The top case 410 may be formed in an "L" shape whose cross-section has at least one curved portion. The top case 410 may include a front portion 411 and a side portion 413. The side portion 413 may extend from one end of the front portion 411 toward the rear. The front portion 411 of the top case 410 may cover at least a portion of the front surface of the display panel 110 and may cover at least a portion of the panel support 431 of the guide panel 430. The side portion 413 of the top case 410 may cover at least a portion of the extension 433 of the guide panel 430 from the outside. As described above, the front portion 411 of the top case 410 may be supported by the first support 435 of the guide panel 430, and the side portion 413 of the top case 410 may be supported by the second support 436 of the guide panel 430.

A second shock absorbing member 213 may be positioned between the front portion 411 of the top case 410 and the display panel 110. The second shock absorbing member 213 may be fixed to the rear surface of the front portion 411 of the top case 410. The second shock absorbing member 213 may be positioned between the front portion 411 of the top case 410 and the display panel 110, preventing a direct collision between the front portion 411 of the top case 410 and the display panel 110. In other words, the second shock absorbing member 213 may prevent damage to the display panel 110 as the top case 410 presses the display panel 110 by the provided external force. The second shock absorbing member 213 may be a foam pad, but is not limited thereto.

The light source housing 460 may be positioned between the display panel 110 and the cover bottom 450. The light source housing 460 may be positioned behind the backlight unit. The light source housing 460 may be positioned at least in the light incident portion and may be disposed to surround the side surface and the rear surface of the backlight unit. The light source housing 460 may be fastened to the cover bottom 450 through at least one fastening member. The fastening member may be a screw, but is not limited thereto.

The light source housing 460 may include a first body 461 surrounding the side surface of the backlight unit and a second body 463 surrounding the rear surface of the backlight unit. The second body 463 may be a portion extending from one end of the first body 461. The first body 461 may be positioned inside the cover bottom 450 to face the first portion 451 of the cover bottom 450. The second body 463 may be positioned inside the cover bottom 450 to face the second portion 453.

The light source module 120 may be seated and fixed to the first body 461 of the light source housing 460 and may be aligned in place by the first body 461 of the light source housing 460. The light source housing 460 may function as a heat dissipation path for dissipating heat generated from the light source module 120. To that end, the light source housing 460 may be formed of, e.g., aluminum, aluminum nitride (AlN), electro-galvanized steel sheet (EGI), stainless steel (SUS), galvalume (SGLC), aluminum-plated steel sheet (as known as ALCOSTA), or tin-plated steel sheet (SPTE). Further, it may be coated with a high-conductivity material for promoting heat transfer. The embodiment of the present invention may effectively dissipate the heat generated from the light source module 120, thereby minimizing damage to the light source module 120 and its periphery due to heat.

The light source housing 460 may directly contact the light source module 120. For example, the printed circuit board 123 may include one surface and another surface opposite to the one surface. The one surface of the printed circuit board may be a portion on which the light source 121 is mounted. The other surface of the printed circuit board 123 may be a portion fixed to the first body 461 of the light source housing 460 via the at least one light source module adhesive member 201.

The light source module adhesive member 201 may be a double-sided tape, a thermosetting adhesive, a photocurable adhesive, or a foam tape. The light source module adhesive member 201 may be a thermal tape.

The second body 463 of the light source housing 460 may be positioned behind the backlight unit to support some components of the backlight unit. For example, the second body 463 of the light source housing 460 may support one end of the light source module 120 in the light incident portion. In other words, the second body 463 of the light source housing 460 may support one end of the printed circuit board 123 from the rear. Further, the second body 463 of the light source housing 460 may support the rear surface of the light guide plate 170 and/or the reflective sheet 190 in the light incident portion. To that end, the second body 463 of the light source housing 460 may further include a forming portion 464 protruding toward the rear surface of the light guide plate 170 and/or the reflective sheet 190. In this case, the forming portion 464 may directly contact the light guide plate 170 and/or the reflective sheet 190. Accordingly, the backlight unit may be stably supported by the light source housing 460, at least in the light incident portion. In a preferred embodiment of the present invention, as the light source module 120 is fixed to the light source housing 460 through the light source module adhesive member 201, the light source module 120 may be aligned in place.

However, when the light source module 120 is fixed to the light source housing 460 only through the light source module adhesive member 201, its position is shifted in the inspection process or use environment, so that the optical characteristics may be degraded. For example, referring to FIG. 6, the light source module 120 and the light source housing 460 may be fixed to each other only through the light source module adhesive member 201. In this structure, when exposed to a reliability test and/or product use environment with a large temperature change, the light source module adhesive member 201 may thermally be expanded/contracted. In this case, the light source module 120 may not be fixed in place but shifted in at least one direction in response to the deformation of the light source module adhesive member 201. Such a change in the position of the light source module 120 is problematic because it may cause a hot spot in the light incident portion. This may be more problematic in the display device 100 for implementing a narrow or extremely narrow bezel.

To prevent this, as shown in FIG. 7, a method for fixing the light source module 120 to the light source housing 460 using a fixing member, such as a screw, may be considered. However, in this case, since a separate manufacturing process is added, it may cause a decrease in manufacturing yield and an increase in manufacturing time and manufacturing cost and may thus be undesirable. Further, it may be difficult to implement a slim display device 100.

As illustrated in FIG. 3, in a preferred embodiment of the present invention, one end of the light source module 120 and the second body 463 of the light source housing 460 may be brought in direct contact with each other to constrain the rearward movement of the light source module 120. Alternatively, the spacing between one end of the light source module 120 and the light source housing 460 may be limited to a preset range considering process deviations. The preset range may be set to 0.3 mm or less. However, even in this case, since it is difficult to constrain and/or limit the forward movement of the light source module 120, a new structure for enhancing this is proposed.

Referring further to FIGS. 4 and 5, the display device 100 according to a preferred embodiment of the present invention may further include a rib 439 formed on the guide panel 430. The rib 439 may extend rearward from the panel support 431 of the guide panel 430. The rib 439 may be positioned inside the extension 433. The rib 439 may be positioned between the extension 433 and the second stopper 438.

One end of the rib 439 (or the protruding surface of the rib 439) may face the other end of the light source module 120. In other words, the rib 439 and the light source module 120 may overlap in the front-rear direction. For example, one end of the rib 439 and the upper portion of the printed circuit board 123 (or the front surface of the printed circuit board 123) may face each other. Or, one end of the rib 439 and the upper portion of the light source 121 of the light source module 120 (or the front surface of the light source 121) may face each other.

The rib 439 may constrain and/or limit the forward movement of the light source module 120. For example, to constrain the movement of the light source module 120, one end of the rib 439 may directly contact the other end of the light source module 120. As another example, to limit the movement of the light source module 120 within a preset range, the spacing G between one end of the rib 439 and the other end of the light source module 120 may be limited to a preset range. In consideration of process deviations, the preset range may be set to 0.3 mm or less.

In a preferred embodiment of the present invention, even when exposed to a reliability test and/or product use environment with a large temperature change, the movement of the fixed light source module 120 may be constrained and/or may be limited to a preset range only through the light source module adhesive member 201. Accordingly, in a preferred embodiment of the present invention, since a change in the position of the light source module 120 may be limited, it is possible to prevent hot spots that may occur in the light incident portion. A preferred embodiment of the present invention may provide a display device 100 implemented with a narrow bezel and an extremely narrow bezel without image quality defects.

The width W1 of the rib 439 may be larger than the width W2 of the light source module 120, particularly the printed circuit board 123. Here, the widths W1 and W2 may mean lengths in the lateral direction. Accordingly, even when the position of the rib 439 is partially shifted due to an assembly error, the rib 439 may overlap the light source module 120 in the front-rear direction. In this case, the rib 439 may overlap at least a portion of the light guide plate 170 and/or the optical sheet 180 in the front-rear direction, but is not limited thereto.

As the rib 439 is formed on the rear surface of the panel support 431 of the guide panel 430, a step may be provided between the extension 433 and the rib 439. In other words, as the rib 439 is formed, a groove 439a may be formed between the extension 433 and the rib 439. In the groove 439a provided between the extension 433 and the rib 439, at least a portion of the first body 461 of the light source housing 460, and at least a portion of the first portion 451 of the cover bottom 450 may be received. Accordingly, the fastening force between the guide panel 430 and the light source housing 460 and/or the cover bottom 450 may be enhanced. Further, since the groove 439a may guide the assembly positions of the guide panel 430, the light source housing 460, and the cover bottom 450, ease of fastening may be ensured.

It will be appreciated by one of ordinary skill in the art that various changes or modifications may be made thereto without departing from the technical spirit of the present invention. Thus, the technical scope of the present invention is not limited to what has been described above but should be defined by the appended claims.

The invention claimed is:

1. A display device, comprising:
a display panel;
a cover bottom at a rear of the display panel;
a backlight unit positioned between the display panel and the cover bottom, and providing light to the display panel; and
a guide panel positioned adjacent to an edge of the display panel,
wherein the guide panel includes:
a panel support positioned between the display panel and the backlight unit; and
an extension extending from the panel support and covering a side surface of the backlight unit,
wherein the backlight unit includes:
a light guide plate between the cover bottom and the panel support of the guide panel; and
a light source module in a light incident portion and radiating light to a side surface of the light guide plate, and
wherein the panel support includes a rib protruding toward the light source module and facing the light source module,
wherein the light source module comprises:
a light source disposed adjacent to the side surface of the light guide panel between the cover bottom and the panel support of the guide panel; and
a substrate on which the light source is mounted, the substrate extending in an extending direction between the rib of the panel support of the guide panel and the cover bottom,
wherein the rib of the panel support of the guide panel overlaps the substrate and the light guide panel in the extending direction of the substrate, and
wherein a first distance between the rib and the substrate is smaller than a second distance between the rib and the light guide panel.

2. The display device of claim 1, further comprising an optical sheet disposed on the light guide plate between the light guide plate and the display panel,
wherein the rib of the panel support of the guide panel overlaps the optical sheet in the extending direction of the substrate, and
wherein the first distance is smaller than a third distance between the rib and the optical sheet.

3. The display device of claim 1,
wherein the first distance is 0.3 mm or less.

4. The display device of claim 1, further comprising,
a light source housing positioned at the light incident portion and including a first body surrounding a side surface of the backlight unit and to which the light source module is fixed and a second body surrounding at least a part of a rear surface of the backlight unit; and
a light source module adhesive member disposed between the light source module and the first body to fix the light source module and the first body.

5. The display device of claim 4,
wherein the light source module is supported by the second body.

6. The display device of claim 4,
the light source module and the second body are spaced apart from each other by a preset distance
and wherein the preset distance is 0.3 mm or less.

7. The display device of claim 4, wherein the cover bottom is positioned behind the light source housing and includes:
a first portion surrounding the side surface of the backlight unit; and
a second portion surrounding the rear surface of the backlight unit,
wherein the panel support includes a groove formed between the extension and the rib,
and wherein at least one of an end of the first body and an end of the first portion is received in the groove.

8. The display device of claim 1, further comprising a panel adhesive member positioned between the display panel and the panel support,
wherein the panel support includes a first stopper protruding forward and positioned inside the panel adhesive member,
and wherein the rib is positioned between the extension and the first stopper.

9. The display device of claim 8, further comprising a first shock absorbing member positioned between the panel support and the backlight unit and fixed to a rear surface of the panel support.

10. The display device of claim 1, further comprising a top case positioned adjacent to the edge of the display panel and including a front portion surrounding at least a portion of a front portion of the display panel and a side portion surrounding the extension from an outside,
wherein the panel support includes a first support protruding toward the front portion and supporting the front portion,
and wherein the extension includes a second support protruding toward the side portion and supporting the side portion.

11. The display device of claim 10, further comprising a second shock absorbing member positioned between the front portion and the display panel and fixed to a rear surface of the front portion.

* * * * *